Aug. 19, 1941.   R. S. BASSETT   2,252,687
GAS AND LIQUID SEPARATING DEVICE
Filed Aug. 26, 1939
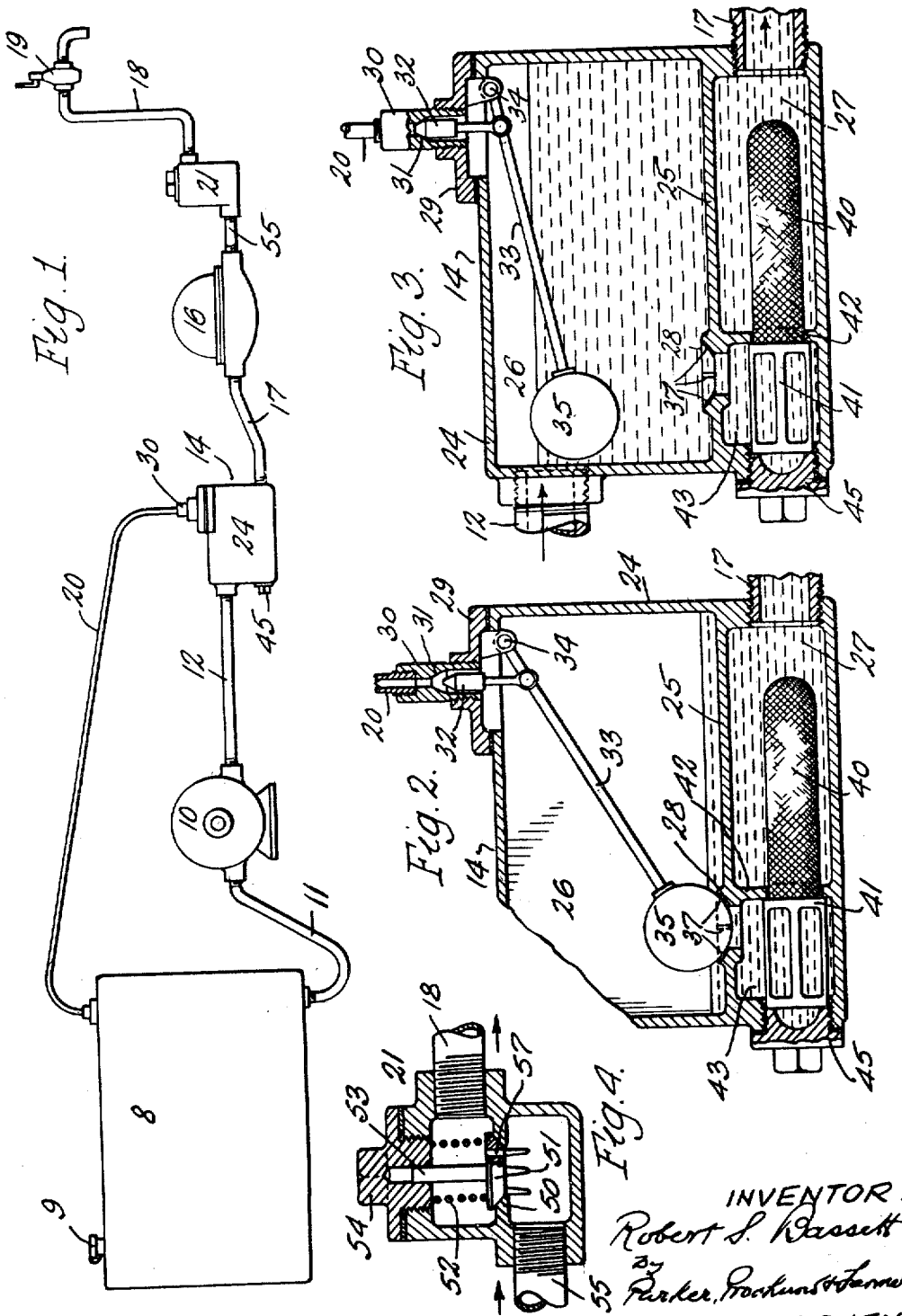
INVENTOR.
Robert S. Bassett
BY
Parker, Prockuns & Lanner.
ATTORNEYS.

Patented Aug. 19, 1941

2,252,687

UNITED STATES PATENT OFFICE 2,252,687

GAS AND LIQUID SEPARATING DEVICE

Robert S. Bassett, Buffalo, N. Y., assignor to Sylvia Bassett, Buffalo, N. Y.

Application August 26, 1939, Serial No. 292,084

1 Claim. (Cl. 183—2.5)

This invention relates to improvements in liquid measuring apparatus, and more particularly to apparatus of this kind for use in measuring liquids, such for example as fuel oil, by means of a meter while the same is being delivered from one container to another.

In most types of meters used in connection with measuring apparatus, if air, gas or vapor passes through the meter, such gaseous medium will be measured, thus producing incorrect measurement of the actual liquid passing through the meter. Gases or vapors may be formed in pipe lines through the evaporation of the more volatile constituents of the oil or other liquid and air is often present in lines due to the lines becoming partially empty when measuring operations are stopped. The term "gas" is herein employed to include air and vapor.

One of the objects of this invention is to provide, in a liquid measuring apparatus, a device of improved construction for removing gas from the liquid and simultaneously blocking the flow of liquid and gas to the meter. It is also an object of this invention to provide, in a system of this kind, a gas and liquid separating device in which the discharge of liquid from the separating device is blocked or impeded in accordance with the level of the liquid in the device. Another object is to provide a single device of this kind which serves the two purposes of alternately closing the gas vent and the liquid flow passage. Another object is to provide a device of this kind which in intermediate positions restricts the flow of liquid.

A further object of this invention is to provide an apparatus of this kind in which the parts are so arranged and constructed as to block to the maximum extent the passage of any air or gas to the meter, and at the same time provide an apparatus from which liquid can readily be drained.

Other objects of this invention will appear from the following description and claim.

In the accompanying drawing:

Fig. 1 is an elevation of an improved liquid measuring apparatus having applied thereto an air and gas separating device embodying this invention.

Figs. 2 and 3 are sectional elevations, on a larger scale, of an air and gas separating device embodying this invention, the movable parts of the device being shown in different positions in the two figures.

Fig. 4 is a central sectional elevation of a back pressure valve.

In Fig. 1, I have shown a liquid measuring apparatus in connection with which my improvements can be used. It will be understood, however, that it is not intended to limit this invention to the use of the particular installation illustrated in Fig. 1. In this figure, 8 represents a tank or container such, for example, as a storage tank for the liquid to be measured, or the tank of a tank car, the tank shown being provided in the upper portion thereof with the usual filling cap 9, which preferably has the usual vent hole through which air may enter to take the place of liquid which is withdrawn from the tank. 10 represents a pump of any suitable type, the inlet end of which is connected by a pipe 11 with the lower portion of the tank 8, and 12 represents a discharge pipe leading from the pump 10. The liquid passes from the pipe 12 into a separating device 14 in which gas, which may be in the form of vapor or air is separated from the liquid which is being handled. 16 represents a meter connected by means of a pipe 17 with the gas separating device 14, and 18 represents a pipe or duct through which measured quantities of the liquid may be discharged, the pipe preferably extending above the liquid level in the tank 8 and being provided with a control valve 19 near the end thereof. The pipe arrangement described is of a type which is suitable for use, for example, for measuring fuel oil and discharging it to a tank truck for delivery to a consumer. 20 represents a gas vent pipe or duct connecting the upper portion of the gas separator 14 with the upper portion of the tank 8, so that the air or gas discharged from the separator 14 is discharged into the top of the tank. A back pressure valve is also employed in my apparatus, that shown in Fig. 1 having a housing 21 and being positioned between the meter 16 and the discharge duct 18.

The separating device which is shown more in detail in Figs. 2 and 3 includes a housing 24 divided by a substantially horizontal partition or web 25 into upper and lower chambers 26 and 27. The upper chamber receives the liquid and gas from the pipe 12, and liquid is discharged from this chamber through an aperture or port 28 in the partition or web 25, the gas being discharged through a gas vent in the top of the upper or separating chamber 26 and which connects with the vent pipe 20. This vent may, for example, be formed in a nipple or pipe connection 30 secured to a cap 29, which may be bolted or otherwise secured to the housing 24 of the separating device. The nipple may have a valve seat 31 formed therein, with which a gas discharge valve 32 may cooperate in such manner that when the valve is raised, it contacts with the seat 31 and closes the vent passage in the nipple 30 leading to the vent pipe 20. The valve 32 has a stem which is suitably connected with a lever 33, pivoted at 34, on a lug or part extending downwardly from the cap 29. This lever is moved about its pivot by means of a suitable float and the lever also actuates a valve for blocking the flow of liquid out of the separating chamber 26 when the vent valve is open. This may be accomplished in any suitable or desired manner, and in the construction illustrated, I provide a combined float and valve member 35, which is sufficiently buoyant to raise the float lever 33 when the liquid level in the separating chamber 26 rises, and which is so arranged on the float lever that it seats on the valve port 28 when the liquid level in the separating chamber falls.

In the operation of the separating device thus far described, when the separating chamber 26 contains mainly gas, the parts occupy the positions shown in Fig. 2, in which the float 35 is in its lowest position and is seated upon the discharge port 28. This places the float lever 33 in a position in which the vent valve 32 is open. Consequently, if the pump 10 is started for the purpose of drawing liquid from the reservoir 8, any gas or liquid entering the upper chamber 26, and the pressure thus built up in this chamber causes gas to be discharged past the vent valve 32 into the vent pipe 20. When liquid enters the chamber 26, the liquid level therein will gradually rise until the combined float and valve member 35 moves from its seat. This, however will not occur until the level of the liquid in the upper chamber 26 has risen well above that indicated in Fig. 2, so that no gas will pass through the discharge port 28 of this chamber. After the combined float and valve member 35 has risen to a point approximately as indicated in Fig. 3, due to the rising of the liquid level in the upper chamber 26, the vent valve 32 will be moved into its closing position so that further escape of gas is prevented. After the closing of the valve 32, the pressure of the liquid in the upper chamber 26 will increase, thus compressing the remaining gas in the chamber into a comparatively small space, which may result in the float valve 35 being almost entirely submerged, as shown in Fig. 3.

While the movement of the combined float and valve member 35 from its seat 28 normally takes place before there is any material increase in pressure in the upper chamber 26, I prefer to provide the valve seat at the port 28 with a plurality of grooves or notches 37 or other passages for liquid which tend in part at least to equalize the pressure acting on the lower part of the float and valve member 35 with that acting on the float valve in the direction to seat the same, thus preventing the pressure within the chamber 26 from holding this member on its seat. The float valve 35 in conjunction with its seat 28 thus acts to block or impede the discharge of liquid from the separating chamber 26 when the valve 35 is in closed position. The parts of the system are preferably so arranged that some liquid will remain in the lower part of the separating chamber 26 between operations of the system, as shown in Fig. 2. This materially reduces the chance of gas passing out of the separating chamber to the meter 16.

The lower chamber 27 of the separating device may be formed in any suitable or desired manner. In the construction illustrated by way of example, this chamber is arranged to contain a strainer 40 of any suitable form through which the liquid passes. This strainer may, for example, be of tubular form having one end open to receive liquid, the sides and the other end thereof being formed of foraminous or straining material. This strainer, as shown, is secured at its open end to a cage or strainer frame 41, which cooperates with an upright partition wall 42 in the lower chamber 27 and which has an aperture through which the strainer 40 may be passed. One end of the cage 41 seats about the aperture in the partition wall 42 so that all liquid entering into a chamber 43 at the left of the partition wall 42, as shown in the drawing, must pass into the cage 41 and from the cage into the strainer 40 which is located at the other side of the partition wall 42, it being understood that the end of the cage 41 adjacent to the strainer 40 is open or apertured to permit the free passage of liquid into the strainer 40.

In order to facilitate the removal of the strainer 40 for inspection or cleaning, the outer side wall of the separating device 14 is preferably provided with a hole or opening of sufficient size to permit the cage and strainer to pass through the same, and this opening may be closed by means of a plug 45 which also serves to hold the cage 41 in proper relation to the partition wall 42 so as to force all of the liquid to pass through the strainer 40.

The back pressure valve may be of any suitable or desired construction, that shown being provided within its housing 21 with a transverse web or partition 50 in which a seat is formed for a back pressure valve 51 of usual construction held in its seat by means of a spring 52 extending about the valve stem 53, the upper end of which is guided in an aperture in a plug or closing member 54 at the upper end of the valve housing. Liquid enters the valve through an inlet pipe or duct 55 below the partition or web 50, and when this liquid has sufficient pressure, it raises the valve from its seat, thus permitting liquid to flow to the upper side of the partition 50 from where it is discharged through the passage or duct 18.

As thus far described, this pressure valve is of standard and well known construction, and the valve may be located in any suitable or desired place between the separating device and the valve 19. I prefer, however, to provide, in that part of the valve structure which extends between its upper and lower compartments, a back pressure valve which will not positively intercept passage of liquid through the same when the valve is closed and, consequently, I provide a small or restricted passage through which a small quantity of liquid may pass when the valve is closed. A passage of this kind may, for example, be provided by drilling through the valve 51 a small hole or aperture 57. The advantage of this construction is that if for any reason, it is desired to drain the liquid from the system, this can easily be accomplished by merely removing the plug 45 in the lower part of the separating device 14, whereupon liquid may be drained out of the system. Any liquid in the upper compartment of the back pressure valve and in the tube or duct 18 will drain through and out of this valve through the drain opening 57. The meter 16 and valve 21 are shown as arranged slightly above the lower portion of the separating device 14 so that liquid from the meter will be drained through the opening formed by the removal of the plug 45. Liquid in the separating chamber 26 will drain through the grooves 37 in the discharge port 28.

The system described has the advantage that it effectively prevents the flow of gas through the meter without providing any positively closed valve which would prevent the draining of the system, if desired, for example, through the aperture 57 of the back pressure valve herein and through the grooves 37 of the discharge port 28 of the separating chamber. The discharge blocking valve 35 in conjunction with the back pressure valve 51 provide sufficient resistance to flow in the system, so that if the separating chamber is practically filled with gas when the pump 10 is started, the gas in the separating chamber 26 will be effectively discharged through the vent passage 20 without having any of the gas pass through the meter. The arrangement of the strainer beyond the discharge outlet from the separating chamber also adds resistance to flow from the separating chamber, which further opposes the passage of gas from the discharge port 28 and, consequently, assists in forcing the gas out through the vent pipe 20. The arrangement of the parts of the system in such a manner that the level of the liquid will not, during normal operation of the system, fall below that shown in Fig. 2, also helps in maintaining sufficient pressure in the system to cause gas to discharge from the separating chamber through the vent pipe 20 in preference to passing through the discharge port 28, since the resistance to flow of liquid through the small recesses 37, the strainer 40, the meter 16, and the small aperture 57 in the discharge valve is much greater than the corresponding resistance to flow of gases into and through the vent pipe 20. The back pressure valve 51, consequently, cooperates with the combined float and liquid discharge valve 35 in such a manner as to very effectively prevent gas from passing through the meter 16, in spite of the fact that neither of these valves entirely shuts off the flow of liquid therethrough.

The float valve 35 causes gas to be vented from the separating chamber 26 through the vent pipe 20 when the pump is started, and when this chamber and the pump contain no liquid. The system also operates to prevent gas from passing to the meter when the container 8 becomes empty, in which case, the float valve 35 acts to block the flow of liquid to the meter and causes the gas pumped to the chamber 26 to be vented through the pipe 20.

The construction described has a further advantage in that when, during the operation of the pump, the separating chamber 26 gradually accumulates gas, the combined float and valve 35 approaches nearer to its seat 28, thus increasing the resistance to the flow of liquid through the port 28. This in turn builds up an increased pressure in the chamber 26 and helps to force the gas out of this chamber into the vent pipe 20.

I claim as my invention:

A gas and liquid separating device including a housing having a substantially horizontal partition therein dividing said housing into an upper separating chamber and a lower chamber, a gas vent valve in the upper portion of said separating chamber, and a liquid discharge port in said partition, a float in said separating chamber which controls said gas vent valve to open the same when the level of liquid in said chamber is low and which blocks the flow of liquid through said discharge port when the level of said liquid in said chamber is low, a strainer arranged in said lower chamber and through which liquid passing out of said discharge port must flow, said lower chamber having an aperture therein, a plug closing said aperture, said strainer being formed to be removable through said aperture when said plug is removed.

ROBERT S. BASSETT.